United States Patent Office 3,838,176
Patented Sept. 24, 1974

3,838,176
EPOXY SUBSTITUTED 2,4-DIENETHIOATES
Clive A. Henrick and John B. Siddall, Palo Alto, Calif., assignors to Zoecon Corporation, Palo Alto, Calif.
No Drawing. Original application Feb. 16, 1971, Ser. No. 115,725, now Patent No. 3,706,733. Divided and this application Aug. 18, 1972, Ser. No. 281,885
Int. Cl. C07d 1/22
U.S. Cl. 260—348 A                    8 Claims

ABSTRACT OF THE DISCLOSURE

Polyunsaturated aliphatic hydrocarbon thiolesters, nitriles, amines, halides, alcohols and derivatives thereof, synthesis thereof, for the control of arthropods.

---

This is a division of application Ser. No. 115,725, filed Feb. 16, 1971, now U.S. Pat. 3,706,733.

This invention relates to novel polyunsaturated aliphatic compounds, novel intermediates therefor, syntheses thereof and to the control of arthropods. The novel polyunsaturated aliphatic compounds are represented by the following formula A:

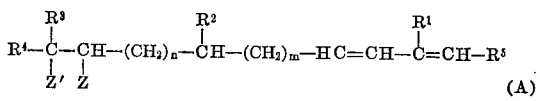

(A)

wherein, $m$ is zero or the positive integer one, two or three;
$n$ is the positive integer one, two or three;
Z is hydrogen, bromo, chloro, fluoro or hydroxy;
Z' is bromo, chloro, fluoro, —OR$^6$, or, taken together with Z, oxido, epithio, imino or carbon-carbon bond;
R$^1$ is hydrogen or alkyl;
each of R$^2$, R$^3$ and R$^4$ is alkyl;
R$^5$ is one of the groups —C≡N, —CH$_2$—X,

—CH$_2$—OR$^7$, CH$_2$—SR$^7$,

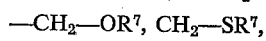

or

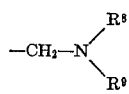

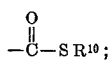;

R$^6$ is hydrogen, carboxylic acyl, alkyl, cycloalkyl, aralkyl or aryl; R$^7$ is hydrogen, alkyl, cycloalkyl, aralkyl or aryl; X is bromo or chloro;
each of R$^8$ and R$^9$ is hydrogen, alkyl, alkenyl, cycloalkyl, hydroxyalkyl, alkoxyalkyl, phenyl, or, when taken together with the nitrogen atom to which they are attached, pyrrolidino, morpholino, piperidino, piperazino or 4-alkylpiperazino; and R$^{10}$ is alkyl.

The compounds of formula A are useful for the control of Arthropods, particularly insects. The compounds are applied using suitable carrier substances, such as either liquid or solid carriers, such as water, acetone, cottonseed oil, xylene, mineral oil, silica, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; Lepidopteran, such as Pyralidae, Noctuidae and Gelechiidae; and Coleoptera, such as Tenebrionidae, Chrysomelidae and Dermestidae. For example, Pyrrhocoris apterus, Lygus hesperus, Aphids, Tenebrio molitor, Triboleum confusm, Diabrotica duodecimpunctata, Dermestes maculatus, Alfalfa weevil, Potatoe tubermoth, Aedes aegypti and Musca domestica. Without any intention of being bound by theory, the compounds of formula A are believed to be effective by reason of hormonal action in that unlike conventional insecticides which are effective by reason of causing immediate death, the compounds of formula A are effective by reason of physiological changes caused in the treated insect which result in eventual death of the insect and/or inability of the treated insect to reproduce by reason of sterility or abnormal development.

In the description hereinafter, each of R$^1$ through R$^{10}$, X, Z, Z', $m$ and $n$ is as defined hereinabove.

The compounds of the present invention are prepared according to the following outlined syntheses:

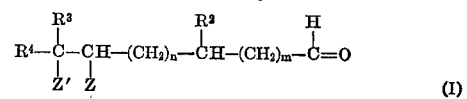

(I)

↓

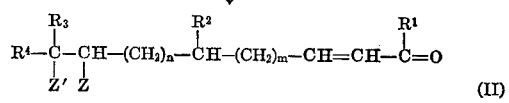

(II)

↓   (A; R$^5$ is —C≡N)  ↓

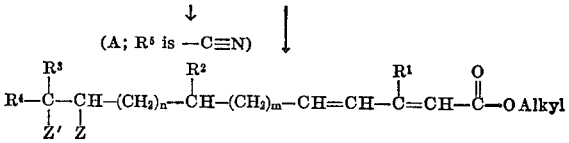

(III)

↓

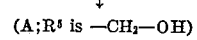

(A;R$^5$ is —CH$_2$—OH)

In the above outlined process, an aldehyde of formula I is reacted with a carbanion of formula IA or by Wittig reaction using an ylid of formula IB to produce a compound of formula II (R is cycloalkyl or phenyl).

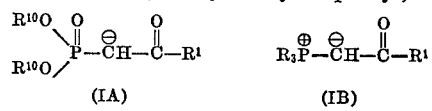

(IA)                (IB)

A compound of formula II is reacted with a dialkyl phosphonoacetonitrile in the presence of base, such as an alkali metal hydride or alkali metal alkoxide, in an organic solvent, such as a hydrocarbon, ether or dialkylsulfoxide, e.g. tetrahydrofuran, benzene, dimethylsulfoxide, toluene, dimethylformamide, and the like, to prepare the novel nitriles of formula A.

The esters of formula III are prepared by the reaction of a compound of formula II with carbanion of dialkyl carbalkoxymethylphosphonate as described in our copending application Ser. No. 111,766, filed Feb. 1, 1971, entitled "Novel Compositions," now abandoned, the disclosure of which is incorporated by reference. Reduction of an ester of formula III using lithium aluminum hydride, or the like, affords the allylic alcohols of formula A (R$^5$ is —CH$_2$—OR$^7$ in which R$^7$ is hydrogen).

Ethers of the alcohols are prepared by etherification of the alcohol of formula A or by first converting the alcohol into the corresponding bromide or chloride (R$^5$ is —CH$_2$—X) and then reacting the halide with the salt of an alcohol according to the ether moiety desired. The halides also serve as precursors for the preparation of the novel thiols, thioethers and amines of the present invention. Thus, reaction of a halide of formula A with thiourea or hydrogen sulfide yields the novel thiols. The thioethers of the present invention are then prepared from a halide of formula A by reaction with a mercaptan or from the thiol. The amines of formula A are prepared by reaction of halide of formula A with the desired amine.

The thiolesters of formula A

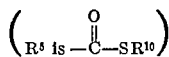

are prepared from the acid chloride by reaction with alkylmercaptan or alkyl lead mercaptide.

The novel epoxides of formula A (Z' taken together with Z is oxido) are prepared by reacting a tri-unsaturated compound of formula A (Z' taken together with Z is a carbon-carbon bond) with an organic peracid, such as perphthalic acid or perbenzoic acid, in an organic solvent. The epoxides serve as precursors for producing the episulfides (A; Z' taken together with Z is epithio) by reaction with potassium thiocyanate or ammonium thiocyanate in an organic solvent, such as a lower alcohol.

The novel mono-halo compounds of formula A (Z' is bromo, chloro or fluoro and Z is hydrogen) are prepared by treating a tri-unsaturated compound of formula A with one equivalent of dry hydrogen halide in a halogenated hydrocarbon solvent of low dielectric constant. The dihalo compounds of formula A (each of Z' and Z is bromo, chloro or fluoro) are produced by treating a triene of formula A with one equivalent of dry bromine, chlorine or fluorine in a halogenated hydrocarbon solvent.

The mono-hydroxy compounds of formula A (Z' is hydroxy, Z is hydrogen) are produced by the addition of water to the terminal olefinic bond using a mercuric salt followed by reduction of the oxy-mercurial intermediate in situ. Suitable mercuric salts include mercuric acetate, mercuric nitrate, mercuric trifluoroacetate, mercuric acrylates and mercuric halides. Suitable reducing agents include the borohydrides, hydrazine and sodium amalgam. See Brown and Rei, *J. Am. Chem. Soc.* 91, 5646 (1969); Brown et al., *J. Am. Chem. Soc.* 89, 1522 and 1524 (1967); and Wakabayashi, *J. Med. Chem.* 12, 191 (January 1969). By conducting the reaction in the presence of an alcohol ($R^6$—OH) such as methanol, ethanol, isopropyl alcohol, benzyl alcohol, cyclopentanol, and the like, the corresponding ether is prepared. The compounds of formula A, wherein $R^6$ is carboxylic acyl, are prepared from a compound of formula A, wherein $R^6$ is hydrogen, by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

The novel aziridines of formula A (Z' taken together with Z is imino) are prepared as follows:

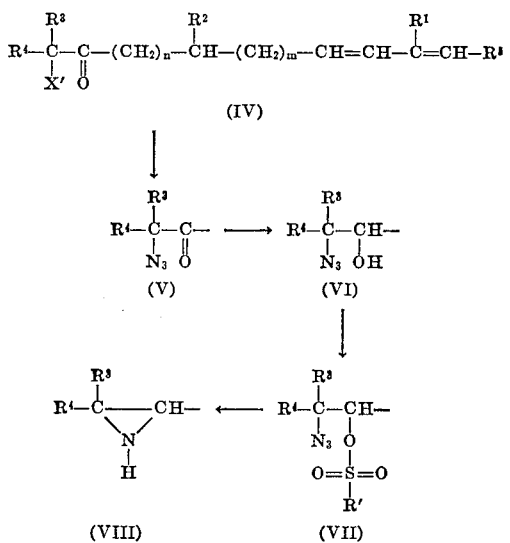

In the above formulas X' is bromo or chloro and R' is methyl or tolyl.

In the practice of the above process, a haloketone of formula IV is reacted with an alkali azide, such as sodium azide, in an organic solvent, such as dimethylformamide, dimethylacetamide, and the like, at room temperature or above to afford the 11-azido compound (V). The azidoketone (V) is then reduced using sodium borohydride or other reducing agent to yield the corresponding 10-hydroxy-11-azido of formula VI. A compound of formula VI is treated with tosyl or mesylchloride in triethylamine, pyridine, or the like, to form the sulfone (VII). A compound of formula VII is then reduced using a reducing agent formed of sodium borohydride and a transition metal, such as a lower valence cobaltous halide. The reducing agent can be formed in the presence or absence of dipyridyl. The reduction and formation of the reducing agent can be carried out in an organic solvent, such as ethanol, methanol, tetrahydrofuran, and other high boiling ethers.

The haloketones (IV) are prepared from the corresponding halohydrin (A; Z' is bromo or chloro and Z is hydroxy) by oxidation using Jones reagent or chromium trioxide/pyridine. The halohydrin is prepared by treatment of an epoxide of formula A with HCl or HBr in the presence of water which affords 11-hydroxy-10-halo, as well, which can be separated by chromatography.

Another embodiment of the present invention is the aziridines of the alkyl ester (III) which can be prepared by the aforementioned procedure. These compounds are used for the control of insects in the same way as the compounds of formula A.

As alternative syntheses embraced in the outlined syntheses above, a mono-unsaturated aldehyde of formula I (Z' taken together with Z is a carbon-carbon bond) can first be elaborated using the methods described above and thereafter converted into the carbonyl of formula II which is then converted into the compounds of formula A.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl group substituted with one alkoxy group, e.g. methoxymethyl, 2-methoxyethyl, 4-ethoxybutyl, n-propoxyethyl and t-butylethyl. The term "alkenyl," as used herein refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenever any of the foregoing terms are modified by the word "lower," the chain length of the group is not more than six carbon atoms with the exception of lower alkoxyalkyl in which event a total chain length of twelve carbon atoms is the maximum.

The following examples are provided to illustrate the present invention. Temperature is given in degrees centigrade.

EXAMPLE 1

To a solution of 25.4 g. of 3,7,11-trimethyldodeca-2,4,10-trienoyl chloride in ether is added 12.4 g. of ethylmercaptan and 11.8 g. of pyridine at —40°. The mixture is allowed to stand at 0° for about 3 hours and then is diluted with ether and water and separated. The ether phase is washed with dilute aqueous sodium hydroxide, dilute hydrochloric acid and then water, dried and solvent removed to yield ethyl 3,7,11-trimethyl-thioldodeca-2,4,10-trienoate.

The process of this example is repeated using each of the acid chlorides under column VII to prepare the respective thiol ester under column VIII.

VII 3,7,11-trimethyltrideca-2,4,10 trienoyl chloride
3,11-dimethyl-7-ethyltrideca-2,4,10-trienoyl chloride
7,11-diethyl-3-methyltrideca-2,4,10-trienoyl chloride
3,8,12-trimethyltrideca-2,4,11-trienoyl chloride
3,7,10-trimethylundeca-2,4,9-trienoyl chloride
3,7,10-trimethyldodeca-2,4,9-trienoyl chloride
3,6,10-trimethylundeca-2,4,9-trienoyl chloride
7,11-dimethyldodeca-2,4,10-trienoyl chloride
7,11-dimethyltrideca-2,4,10-trienoyl chloride
7-ethyl-11-methyltrideca-2,4,10-trienoyl chloride
7,11-diethyltrideca-2,4,10-trienoyl chloride
8,12-dimethyltrideca-2,4,11-trienoyl chloride
7,10-dimethyl undeca-2,4,9-trienoyl chloride
7,10-dimethyldodeca-2,4,9-trienoyl chloride
6,10-dimethylundeca-2,4,9-trienoyl chloride.

VIII ethyl 3,7,11-trimethyl-thioltrideca-2,4,10-trienoate
ethyl 3,11-dimethyl-7-ethyl-thioltrideca-2,4,10-trienoate
ethyl 7,11-diethyl-3-methyl-thioltrideca-2,4,10-trienoate
ethyl 3,8,12-trimethyl-thioltrideca-2,4,11-trienoate
ethyl 3,7,10-trimethyl-thiolundeca-2,4,9-trienoate
ethyl 3,7,10-trimethyl-thioldodeca-2,4,9-trienoate
ethyl 3,6,10-trimethyl-thiolundeca-2,4,9-trienoate
ethyl 7,11-dimethyl-thioldodeca-2,4,10-trienoate
ethyl 7,11-dimethyl-thioltrideca-2,4,10-trienoate
ethyl 11-methyl-7-ethyl-thioltrideca-2,4,10-trienoate
ethyl 7,11-diethyl-thioltrideca-2,4,10-trienoate
ethyl 8,12-dimethyl-thioltrideca-2,4,11-trienoate
ethyl 7,10-dimethyl-thiolundeca-2,4,9-trienoate
ethyl 7,10-dimethyl-thioldodeca-2,4,9-trienoate
ethyl 6,10-dimethyl-thiolundeca-2,4,9-trienoate.

Methylmercaptan is reacted with each of the trienoyl chlorides above using the procedure of this example except that the reaction mixture is prepared at about −10° and the reaction is carried out in a sealed vessel to prepare the respective methyl thiol esters, e.g.—methyl 3,7,11 - trimethyl-thioldodeca-2,4,10-trienoate, methyl 3,7,11-trimethyl-thioltrideca - 2,4,10 - trienoate, methyl 3,11-dimethyl-7-ethyl-thioltrideca-2,4,10-trienoate, etc.

EXAMPLE 2

3,7,11-trimethyltrideca-2,4,10-trienoyl chloride (18 g.) is added slowly to ethyl lead mercaptide (13.4 g.) covered with ether. The mixture is allowed to stand overnight and then is filtered. The filtrate is evaporated under reduced pressure to yield ethyl 3,7,11-trimethyl-thioltrideca-2,4,10-trienoate which can be purified by chromatography.

EXAMPLE 3

To a mixture of 24 g. of ethyl 3,7,11-trimethyl-thioldodeca-2,4,10-trienoate in 75 ml. of ether, cooled in an ice-bath, is slowly added 0.1 mole of perphthalic acid in ether. Then the reaction mixture is allowed to stand for about 30 minutes. The mixture, at room temperature, is shaken with dilute aqueous sodium hydroxide and then separated. The organic phase is washed with water, dried over magnesium sulfate and evaporated under reduced pressure to yield ethyl 10,11-oxido-3,7,11-trimethylthioldodeca-2,4-dienoate, which is purified by chromatography on neutral silica gel.

The above process is repeated using each of the unsaturated esters under column VIII to prepare the respective epoxide under column IX.

IX ethyl 10,11-oxido-3,7,11-trimethyl-thioltrideca-2,4-dienoate
ethyl 10,11-oxido-3,11-dimethyl-7-ethyl-thioltrideca-2,4-dienoate
ethyl 10,11-oxido-7,11-diethyl-3-methyl-thioltrideca-2,4-dienoate
ethyl 11,12-oxido-3,8,12-trimethyl-thioltrideca-2,4-dienoate
ethyl 9,10-oxido-3,7,10-trimethyl-thioltrideca-2,4-dienoate
ethyl 9,10-oxido-3,7,10-trimethyl-thiolundeca-2,4-dienoate
ethyl 9,10-oxido-3,6,10-trimethyl-thiolundeca-2,4-dienoate
ethyl 10,11-oxido-7,11-dimethyl-thioldodeca-2,4-dienoate
ethyl 10,11-oxido-7,11-dimethyl-thioltrideca-2,4-dienoate
ethyl 10,11-oxido-11-methyl-7-ethyl-thioltrideca-2,4-dienoate
ethyl 10,11-oxido-7,11-diethyl-thioltrideca-2,4-dienoate
ethyl 11,12-oxido-8,12-dimethyl-thioltrideca-2,4-dienoate
ethyl 9,10-oxido-7,10-dimethyl-thiolundeca-2,4-dienoate
ethyl 9,10-oxido-7,10-dimethyl-thioldodeca-2,4-deinoate
ethyl 9,10-oxido 6,10-dimethyl-thiolundeca-2,4-dienoate

EXAMPLE 4

To a mixture of 2 g. of methyl 3,7,11-trimethyl-thioltrideca-2,4,10-trienoate in 150 ml. of methylene chloride at 0° is slowly added 1.0 molar equivalent of m-chloroperbenzoic acid in 100 ml. of methylene chloride. The resulting mixture is allowed to stand for 30 minutes at 0° and then washed with 2% aqueous sodium sulfite solution, with 5% aqueous sodium bicarbonate solution and with water, dried over sodium sulfate and evaporated to yield methyl 10,11-oxido-3,7,11-trimethyl-thioldodeca-2,4-dienoate which is purified by chromatography.

What is claimed is:

1. A compound selected from those of the following formula:

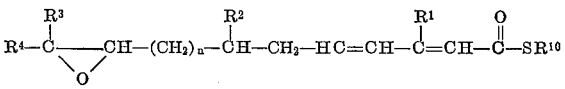

wherein,
$R^1$ is hydrogen or methyl;
each of $R^2$, $R^3$ and $R^4$ is methyl or ethyl;
$R^{10}$ is lower alkyl; and
$n$ is one or two.

2. A compound according to Claim 1 wherein $R^{10}$ is methyl or ethyl and $R^1$ is methyl.

3. A compound according to Claim 1 wherein $R^{10}$ is methyl or ethyl and $R^1$ is hydrogen.

4. A compound according to Claim 2 wherein $R^{10}$ is ethyl.

5. The compound, ethyl 10,11-oxido-3,7,11-trimethyl-thioldodeca-2,4-dienoate, according to Claim 4.

6. The compound, ethyl 9,10 - oxido-3,7,10-trimethyl-thioldodeca-2,4-dienoate, according to Claim 2.

7. The compound, ethyl 10,11-oxido-3,7,11-trimethyl-thioltrideca-2,4-dienoate, according to Claim 4.

8. The compound, ethyl 10,11-oxido-3,11-dimethyl-7-ethyl-thioltrideca-2,4-dienoate, according to Claim 4.

References Cited
UNITED STATES PATENTS

| | | | |
|---|---|---|---|
| 2,951,853 | 9/1960 | Matsui | 260—347.5 |
| 3,637,674 | 1/1972 | Jarolim et al. | 260—240 |

NORMA S. MILESTONE, Primary Examiner

U.S. Cl. X.R.

424—278, DIG. 12